United States Patent [19]

Spooner

[11] Patent Number: 4,743,719
[45] Date of Patent: May 10, 1988

[54] ARC INTERRUPTER

[75] Inventor: James Spooner, Sunderland, England

[73] Assignee: Northern Engineering Industries plc, New Castle upon Tyne, England

[21] Appl. No.: 19,943

[22] Filed: Feb. 27, 1987

[30] Foreign Application Priority Data

Mar. 25, 1986 [GB] United Kingdom ............... 8607398

[51] Int. Cl.⁴ .......................................... H01H 33/18
[52] U.S. Cl. ............................................. 200/147 R
[58] Field of Search .................................. 200/147 R

[56] References Cited

U.S. PATENT DOCUMENTS

| | | | |
|---|---|---|---|
| 3,891,814 | 6/1975 | Hertz et al. | 200/147 R |
| 4,303,814 | 12/1981 | Scheibe | 200/147 R |
| 4,355,219 | 10/1982 | Parry | 200/147 R |
| 4,463,230 | 7/1984 | Perrenoud | 200/147 R |
| 4,503,302 | 3/1985 | Chrisp | 200/147 R |
| 4,525,612 | 6/1985 | Kawashima | 200/147 R |

Primary Examiner—Robert S. Macon
Attorney, Agent, or Firm—Rosen, Dainow & Jacobs

[57] ABSTRACT

In arc interrupters having fixed and movable contacts and a fixed annular electrode surrounded by an arc-driving coil, the problem of electrode collapse owing to the magnetic forces generated in the electrode and the coil is reduced or obviated by providing the electrode with at least one flange which is supported against distortion by ferromagnetic material which forms part of a magnetic circuit produced by the coil when it is part of an arc current path.

13 Claims, 3 Drawing Sheets

4,743,719

ARC INTERRUPTER

BACKGROUND TO THE INVENTION

The invention relates to arc interrupters.

To assist in extinguishing arcs in arc interrupters, which operate in an insulating fluid, for example sulphur hexafluoride ($SF_6$) gas under pressure, it has been proposed to rotate the arc about an axis. Examples of such arc interrupters are described in UK Patent Applications Publication Nos. 2038100A, 2044538A, 2052160A and 2092385A and in UK Patent No. 2119573B (equivalent to U.S. Pat. No. 4,503,302). Typically, such arc interrupters have fixed and movable contacts, an annular arcing electrode and an arc-driving coil connected in series with the electrode. In such interrupters, the arc, once fully established, extends between the electrode and one of the contacts and is driven by the coil about the central axis of the electrode.

To avoid problems associated with insulating the arc-driving coil from the arc, it is preferred to locate the coil externally of the electrode.

However, as the rating of the interrupters (for example, as described in UK Patent No. 2119573B) are increased, it was found that plain cylindrical electrodes tended to collapse owing to the increased magnetic fields generated by the currents induced in the electrode by the magnetic fields generated by the coil, which magnetic fields are in opposition to one another.

Although the problem can be alleviated to some extent by increasing the cross-section of the electrode at lower ratings, it is not a practical solution at higher ratings owing to the increased costs of material and increased weight and size of the electrode.

It is possible to increase the strength of the electrode by providing radially-extending flanges. Some such electrode configurations are shown in the above-mentioned published Applications. However, in those instances, the flanges appear to have been provided for other reasons, for example to provide an arc runner or to protect the coil ends from the arc (which is initally struck in the immediate vicinity of the coil ends).

It has been found, however, that the electrode can distort owing to the generation in the flanges of magnetic fields, which oppose the fields generated by the coil, by currents induced in the electrode by the fields generated by the coil.

SUMMARY OF THE INVENTION

It is an object of the present invention to provide an arc interrupter in which the afore-mentioned problems are reduced or obviated.

According to the invention, an arc interrupter comprises fixed and movable contacts, a fixed electrode having at least one flange, first and second coaxial arcing surfaces separated by an annular gap provided, respectively, by one of said contacts and said electrode, said first arcing surface being closer to the common axis of said arcing surfaces than said second arcing surface, an arc-driving coil surrounding said electrode, said coil being coaxial with said arcing surfaces and being electrically connected at one end to said electrode whereby said coil is included in series with said arcing surfaces in an arc current path at least during a later part of the opening of a main current path formed by said contacts in a make position and ferromagnetic material which forms part of a magnetic circuit produced by said coil when said coil is a part of said arc current path, said ferromagnetic material being arranged to support said flange of said electrode against distortion.

Preferably, said movable contact is mounted for angular movement about a pivot axis between said make position and a break position.

Preferably, said first arcing surface is provided by said fixed contact and in said make position, said movable contact extends from said pivot axis towards said common axis and is in engagement with said fixed contact and, in said break position, said movable contact is disengaged from said fixed contact and the least distance between said contacts is greater than said gap.

In one preferred embodiment of the invention, said electrode comprises a tube having, at an end thereof adjacent said contacts, a first outwardly-extending flange and, at the opposite end thereof, a second inwardly-extending flange, said ferromagnetic material comprising a cylinder having an inwardly-extending flange secured to said first flange of said electrode. Preferably, said first flange of said electrode is divided by radial slots extending from the outer periphery thereof substantially through the whole width of said first flange, said slots being registered with corresponding radial slots extending partially through the width of said flange of ferromagnetic material from the inner periphery thereof.

In a second preferred embodiment of the invention, said electrode comprises a tube having at each end an outwardly-extending flange, said ferromagnetic material comprising arcuate members which are mounted around the periphery of said electrode and which have inwardly-extending flanges between which said flanges of said electrode are located in nesting relationship therewith to be supported thereby. Preferably, adjacent members are separated by a circumferentially-extending gap.

The invention includes an electric switch comprising at least one arc interrupter according to the invention.

BRIEF DESCRIPTION OF THE DRAWINGS

Electric switches will now be described to illustrate the invention by way of example only with reference to the accompanying drawings, in which.

DESCRIPTION OF THE PREFERRED EMBODIMENTS

Figure 1:
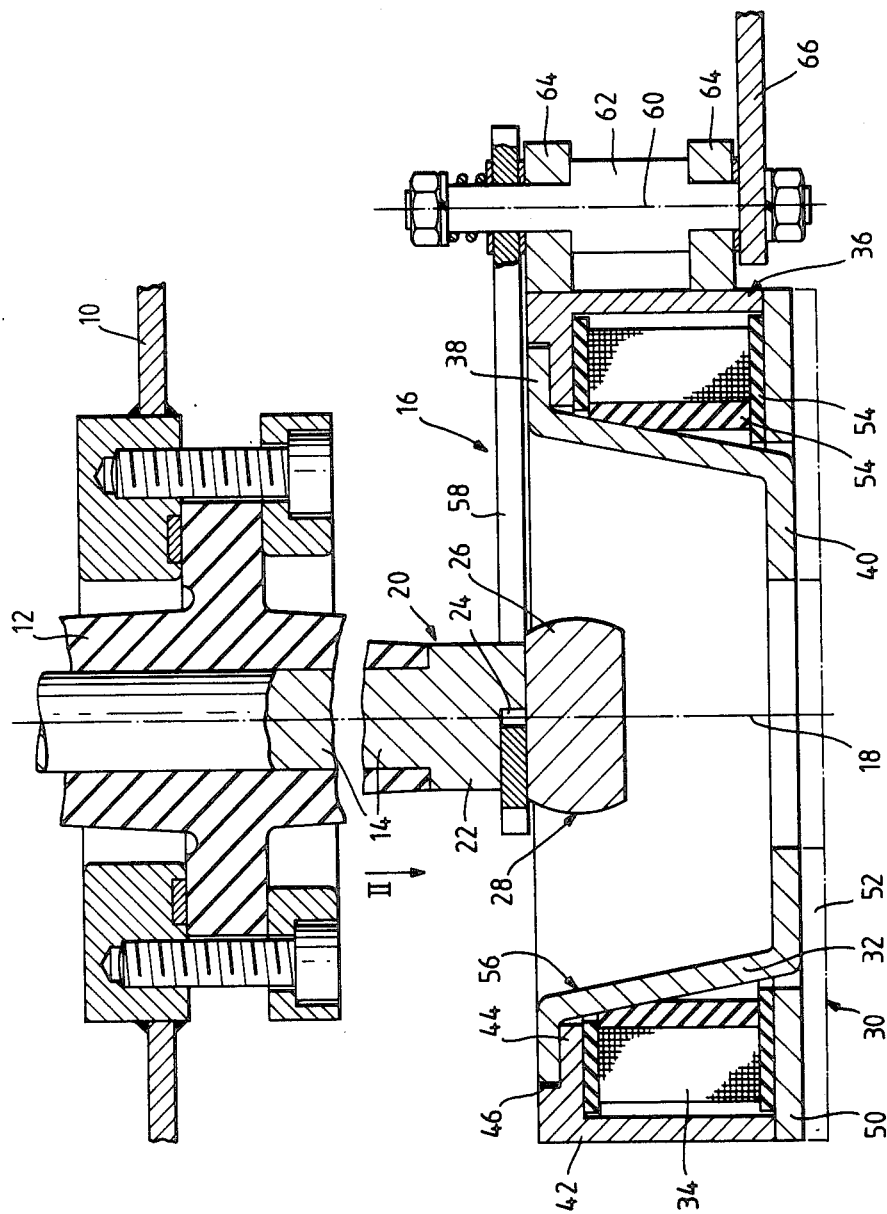
FIG. 1 is a schematic longitudinal section through the fixed contact of a first embodiment of an arc interrupter according to the invention.

The electric switch (see FIGS. 1 and 2) is of the type described and claimed in UK Patent No. 2119573B and reference should be made to that document for details concerning the construction of such switches.

Briefly, however, the switch has a housing 10 of metal for example defining an enclosure which is filled with an insulating medium for example $SF_6$ gas under pressure. A bushing 12 insulates a main copper conductor 14 from, and enables it to pass in sealed relationship, through the housing 10. A second main conductor (not shown) is similarly mounted relative to the housing 10 at a location remote from the conductor 14. The two main conductors carry one phase of the current supplied through the switch.

An arc interrupter 16 forms part of an openable main current path between the two main conductors. The conductor 14 and the interrupter 16 are coaxial with one another on the common axis 18.

The interrupter has a fixed contact 20 formed on the end of the conductor 14 coaxially with the axis 18. The fixed contact 20 has a first cylindrical part 22, from which a segment has been removed to leave a slot 24. A second barrel-shaped part 26 is resiliently mounted (not shown) on the part 22 whereby a movable contact 58 located in the slot 24 is engaged by the parts 22, 26 under pressure. The part 26 has a first arcing surface 28 coaxial with the axis 18.

A fixed assembly 30 is secured to the housing 10 through insulated mounts (not shown). The assembly 30 comprises a tubular arcing electrode 32 of copper which is mounted coaxially with the axis 18 and is surrounded by, and electrically connected (not shown) to one end of, an arc-driving coil 34. The other end (not shown) of the coil 34 is electrically connected to the second main conductor. To enhance the effect of the coil 34 on the arc, particularly at low currents, ferromagnetic material 36 such as mild steel is located around the coil 34.

The electrode 32 is frusto-conical in shape and has, at the end thereof adjacent the contacts 20, 58, an outwardly-extending flange 38 and, at its opposite end, an inwardly-extending flange 40. The shape of the electrode 32 together with the flanges 38, 40 improves the ability of the electrode 32 to resist the forces tending to collapse the electrode radially inwardly as compared with a plain cylindrical electrode. The forces arise, during arc interruption, owing to the magnetic field generated by the arcing current flowing in the coil 34 inducing an opposing current in the electrode 32 and that current generating a magnetic field opposing the coil magnetic field.

The induced current is set up in the flanges 38, 40 of the electrode 32 as well as in the axial extent of the electrode 32. The magnetic field generated by the induced current particularly affects the flange 38 owing to its proximity to the end of the coil 34 and to the ferromagnetic material 36 which concentrates the magnetic fields. At high currents, the strengths of the opposed fields are sufficient to distort the flange 38.

To support the flange 38 againt those forces, the ferromagnetic material 36 is provided in the form of a cylinder 42 which has an inwardly-extending flange 44 which is recessed at 46 to receive the flange 38. The flange 38 is bolted or otherwise secured at 48 to the flange 44 to be supported thereby against the effects of the opposing fields.

The ferromagnetic material 36 also consists of an annular plate 50 which is bolted to the cylinder 42. Although the flange 40 of the electrode 32 is less susceptible to distortion owing to its remoteness from the end of the coil 34, if necessary (particularly if the contribution of the ferromagnetic material 36 is to be increased), flange 40 can be supported also. To that end the radial extent of the plate 50 is increased and the plate 50 is shaped to accommodate the flange 40 which is then bolted to the plate 50. The modified outline of the plate 50 is shown in ghost outline at 52 in FIG. 1.

The cylinder 42 and the plate 50 also support the coil 34 in position, the coil 34 being insulated from the electrode 32 and the ferromagnetic material 36 by insulating material 54.

The electrode 32 has an internal surface which forms a second arcing surface 56 coaxial with the axis 18 and spaced from and positioned substantially opposite to the arcing surface 28 so than an annular gap exists between the arcing surfaces 28 and 56.

A movable contact 58 is located adjacent the assembly 30.

The contact 58 is made of copper and is arcuate in shape as seen along the axis 18. The contact 58 is mounted for angular movement about a pivot axis 60 parallel to the axis 18 by a pivot block 62 mounted on the assembly 30 by flanges 64 extending, but electrically insulated (not shown), from the cylinder 42 of the ferromagnetic material 36. The lower end of the pivot block 62 is electrically connected to the second main conductor by a bar 66, for example.

The movable contact 58 is angularly movable by mechanism (not shown) between a make position (see FIG. 1) in which the contact 58 extends from the pivot axis 60 towards the axis 18 and engages the fixed contact 20 and a break position in which the least distance between the contact 58 and the fixed contact 20 is greater than the gap between the arcing surfaces 28 and 56.

OPERATION

The interrupter 16 is shown in the make position. The main current path is through the main conductor 14, the fixed contact 20, the movable contact 58, the pivot block 62, the bar 66 and the second main conductor.

Actuation of the operating mechanism causes the movable contact 58 to move to the break position. As the contact 58 disengages from the contact 20, an arc is struck between the contacts 20, 58. As the contact 58 passes over the electrode 32, the arc is transferred to the electrode 32 which brings the arc-driving coil 34 into an arc current path. The magnetic field generated by the coil causes the arc to rotate about the axis 18.

At an appropriate current zero the arc is extinguished.

The interrupter is closed by reverse operation of the operating mechanism which causes the contact 58 to return to its make position.

The switch described with reference to FIGS. 1 and 2 has a normal rating of 12 kilovolts (kV), 1.25 kiloamps (ka) and a fault rating of 25 kA.

Figure 2:
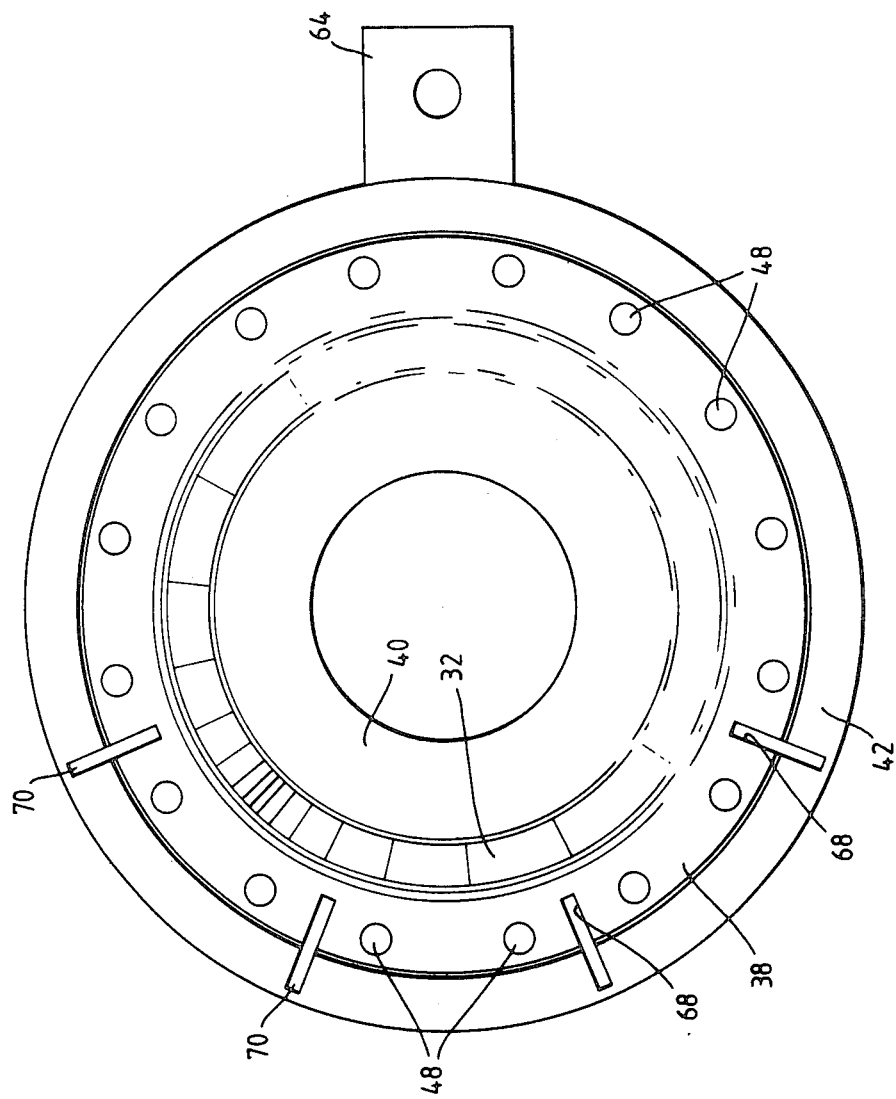
FIG. 2 is a view on arrow II in FIG. 1 of the fixed electrode shown in FIG. 1, the right and left hand halves of the Figure showing two versions of the interrupter.

In a modification, to improve the switch rating even further, the flange 38 of the electrode 32 has spaced-apart radial slots 68 extending through substantially the whole width of the flange 38; and the flange 44 and the cylinder 52 have corresponding slots 70 extending partly through the width thereof, the slots 70 registering with the slots 68 (see the left hand half of FIG. 2). The slots 68, 70 disrupt the annularly-circulating induced currents and thereby minimising the strength of the magnetic field opposing the coil magnetic field. If necessary, the flange 40 and the plate 50 (as shown at 52) can be similarly slotted.

Figure 3:
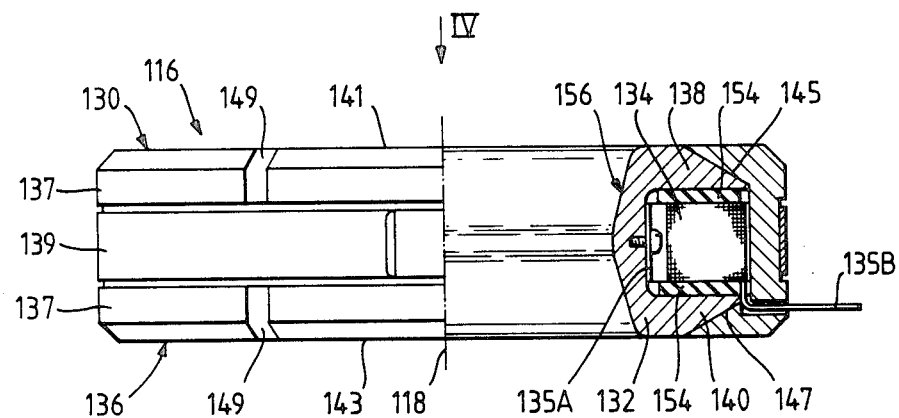
FIG. 3 is a view similar to FIG. 1 of a second embodiment of an arc interrupter according to the invention, but only partly in section and with the fixed and movable contacts ommitted.
Figure 4:
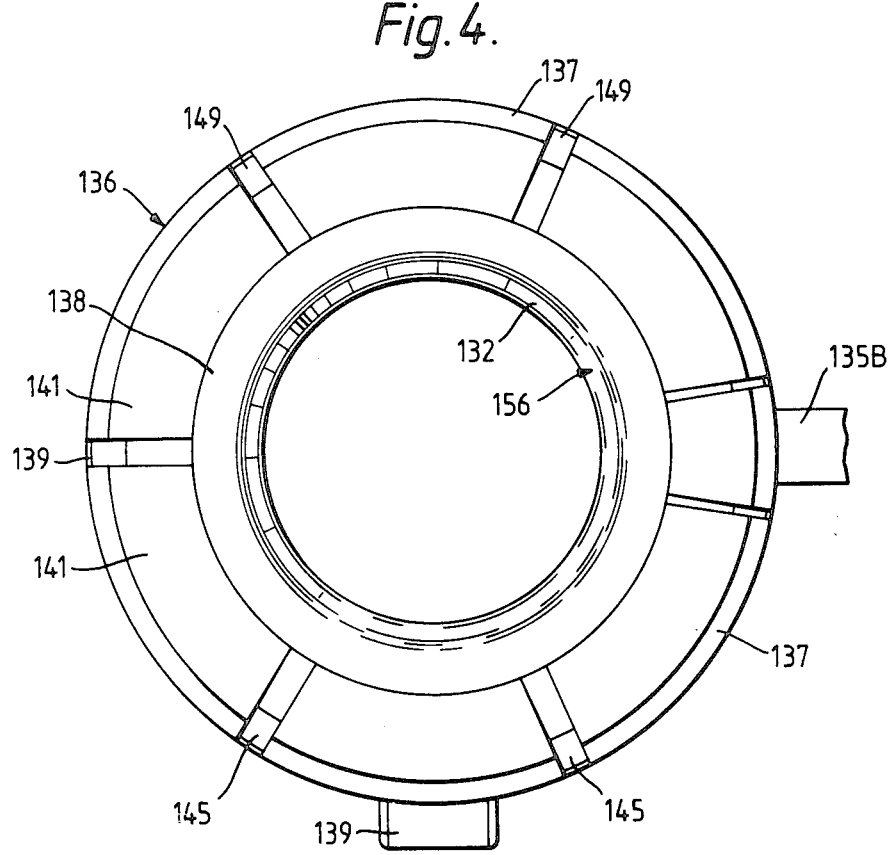
FIG. 4 is a view on arrow IV in FIG. 3.

Referring to FIGS. 3 and 4, only the fixed assembly 130 of an interrupter 116 has been shown, the remainder of the switch and the interrupter 116 being similar to the construction shown in FIGS. 1 and 2. The parts of the interrupter 116 similar to the parts of the interrupter 16 have been given like reference numerals but with the prefix "1".

The assembly 130 has a tubular arcing electrode 132 of copper which is mounted coaxially with the axis 118 of the interrupter 116 and which has an inner arcing surface 156. The electrode 132 has two outwardly-extending flanges 138, 140 between which is located an arc-driving coil 134. The coil 134 is spaced by insulating material 154 from the electrode 132. The coil 134 is electrically connected at one end 135A to the electrode 132 and is electrically connected at the other end 135B to the second main conductor.

The pivot block for the movable contact is separate from the fixed assembly 130 and is not shown.

The ferromagnetic material 136 is in the form of arcuate members 137 which are mounted around the periphery of the electrode 132 and retained relative thereto by a strap 139. The members 137 each have inwardly extending flanges 141, 143 between which the flanges 138, 140 of the electrode 132 are located in nesting relationship to be supported thereby. The flanges 138, 140 have frusto-conical outer surfaces 145, 147, respectively, which engage complementary surfaces on the flanges of the members 137. Adjacent members 137 are separated by a radial gap 149 whereby the effects of circulating currents induced in the members 137 are minimised.

In a modification (not shown), the flanges 138, 140 of the electrodes have radial slots, the members 137 being so located that the gaps 149 register with the slots.

Typically, switches having interrupters in accordance with the invention can have normal ratings of up to 36 kV, 2 kA and fault condition ratings of up to 40 kA.

What is claimed is:

1. An arc interrupter comprising fixed and movable contacts, a fixed electrode which comprises a tube having flanges at each end thereof, at least one of said flanges extending outwardly from said fixed electrode, first and second coaxial arcing surfaces separated by an annular gap provided, respectively, by one of said contacts and said electrode, said first arcing surface being closer to the common axis of said arcing surfaces than said second arcing surface, an arc-driving coil surrounding said electrode, said coil being coaxial with said arcing surfaces and being electrically connected at one end to said electrode whereby said coil is included in series with said arcing surfaces in an arc current path at least during a later part of the opening of a main current path formed by said contacts in a make position and ferromagnetic material which forms part of a magnetic circuit produced by said coil when said coil is a part of said arc current path, said ferromagnetic material being arranged in overlapping relationship with said one flange of said fixed electrode thereby to support said one flange of said fixed electrode against distortion.

2. An interrupter according to claim 1, in which said movable contact is movable between said make position and a break position by angular movement about a pivot axis which is parallel to said common axis, and in which said first arcing surface is provided by said fixed contact and, in said make position, said movable contact extends normally from said pivot axis and is in engagement with said fixed contact and, in said break position, said movable contact is disengaged from said fixed contact and the least distance between said contacts is greater than said gap.

3. An arc interrupter comprising fixed and movable contacts, a fixed electrode which comprises a tube having at an end thereof adjacent said contacts, a first outwardly-extending flange and, at the opposite end thereof, a second inwardly-extending flange, first and second coaxial arcing surfaces separated by an annular gap provided, respectively, by one of said contacts and said electrode, said first arcing surface being closer to the common axis of said arcing surfaces than said second arcing surface, an arc-driving coil surrounding said electrode, said coil being coaxial with said arcing surfaces and being electrically connected at one end to said electrode whereby said coil is included in series with said arcing surfaces in an arc current path at least during a later parat of the opening of a main current path formed by said contacts in a make position and ferromagnetic material which forms aparts of a magnetc circuit produced by said coil when said coil is a part of said arc current path, said ferromagnetic material comprising a cylinder having an inwardly-extending flange secured to said first flange of said electrode thereby to support said first flange against distortion.

4. An interrupter according to claim 3, in which said first flange of said electrode is divided by radial slots extending from the outer periphery thereof substantially through the whole width of said first flange, said slots being registered with corresponding radial slots extending partially through the width of said flange of ferromagnetic material from the inner periphery thereof.

5. An interrupter according to claim 4, in which said ferromagnetic material further comprises an annular inwardly-extending part secured to said second flange of said electrode.

6. An interrupter according to claim 3, in which said ferromagnetic material further comprises an annular inwardly-extending part secured to said second flange of said electrode.

7. An arc interrupter comprising fixed and movable contacts, a fixed electrode which comprises a tube having at each end an outwardly-extending flange, first and second coaxial arcing surfaces separated by an annular gap provided, respectively, by one of said contacts and said electrode, said first arcing surface being closer to the common axis of said arcing surfaces than said second arcing surface, an arc-driving coil surrounding said electrode, said coil being coaxial with said arcing surfaces and being electrically connected at one and to said electrode whereby said coil is included in series with said arcing surfaces in an arc current path at least during a later part of the opening of a main current path formed by said contacts in a make position and ferromagnetic material which forms part of a magnetic circuit produced by said coil when said coil is a part of said arc current path, said ferromagnetic material comprising arcuate members which are mounted around the periphery of said electrode and which have inwardly-extending flanges between which said flanges of said electrode are located in nesting relationship therewith to be supported against distortion thereby.

8. An interrupter according to claim 7, in which adjacent members are separated by a radial gap.

9. An interrupter according to claim 7, in which said flanges of said electrode are divided by radial slots extending from the outer periphery thereof substantially through the whole width thereof.

10. An interrupter according to claim 8, in which said flanges of said electrode are divided by radial slots extending from the outer periphery thereof substantially through the whole width thereof and in which said members are located such that said gaps between adjacent members register with said slots.

11. An electric switch comprising a housing containing insulating medium and conductor means which form an openable main current path within the housing and which includes at least one arc interrupter comprising fixed and movable contacts, a fixed electrode which comprises a tube having flanges at each end thereof, at least one of said flanges extending outwardly from said fixed electrode, first and second coaxial arcing surfaces separated by an annular gap provided, respectively, by one of said contacts and said electrode, said first arcing surface being closer to the common axis of said arcing surfaces than said second arcing surface, an arcdriving coil surrounding said electrode, said coil being coaxial with said arcing surfaces and being electrically connected at one end to said electrode whereby said coil is included in series with said arcing surfaces in an arc current path at least during a later part of the opening of a main current path formed by said contacts in a make position and ferromagnetic material which forms part of a magnetic circuit produced by said coil when said coil is a part of said arc current path, 1 said ferromagnetic amterial being arranged in overlapping relationship with said one flange of said fixed electrode thereby to support said one flange against distortion.

12. An electric switch comprising a housing containing insulating medium and conductor means which form an openable main current path within the housing and which includes at least one arc interrupter comprising fixed and movable contacts, a fixed electrode which comprises a tube having, at an end thereof adjacent said contacts, a first outwardly-extending flange and, at the opposite end thereof, a second inwardly-extending flange, first and second coaxial arcing surfaces separated by an annular gap provided, respectively, by one of said contacts and said electrode, said first arcing surface being closer to the common axis of said arcing surfaces than said second arcing surface, an arc-driving coil surrounding said electrode, said coil being coaxial with said arcing surfaces and being electrically connected at one end to said electrode whereby said coil is included in series with said arcing surfaces in an arc current path at least during a later part of the opening of a main current path formed by said contacts in a make position and ferromagnetic material which forms part of a magnetic circuit produced by said coil when said coil is a part of said arc current path, said ferromagnetic material comprising a cylinder having an inwardly-extending flange secured to said first flange of said electrode thereby to support said first flange against distortion.

13. An electric switch comprising a housing containing insulating medium and conductor means which form an openable main current path within the housing and which includes at least one arc interrupter comprising fixed and movable contacts, a fixed electrode which comprises a tube having at each end an outwardly-extending flange, first and second coaxial arcing surfaces separated by an annular gap provided, respectively, by one of said contacts and said electrode, said first arcing surface being closer to the common axis of said arcing surfaces than said second arcing surface, an arc-driving coil surrounding said electrode, said coil being coaxial with said arcing surfaces and being electrically connected at one end to said electrode whereby said coil is included in series with said arcing surfaces in an arc current path at least during a later part of the opening of a main current path formed by said contacts in a make position and ferromagnetic material which forms parts of a magnetic circuit produced by said coil when said coil is a part of said arc current path, said ferromagnetic material comprising arcuate members which are mounted around the periphery of said electrode and which have inwardly-extending flanges between which said flanges of said electrode are located in nesting relationship therewith to be supported against distortion thereby.

* * * * *

UNITED STATES PATENT AND TRADEMARK OFFICE
CERTIFICATE OF CORRECTION

PATENT NO. : 4,743,719

DATED : May 10, 1988

INVENTOR(S) : James Spooner

It is certified that error appears in the above-identified patent and that said Letters Patent is hereby corrected as shown below:

Column 4, line 57, change "52" to --42--.

Signed and Sealed this

Twenty-first Day of August, 1990

*Attest:*

HARRY F. MANBECK, JR.

*Attesting Officer*     *Commissioner of Patents and Trademarks*